Figure 1:
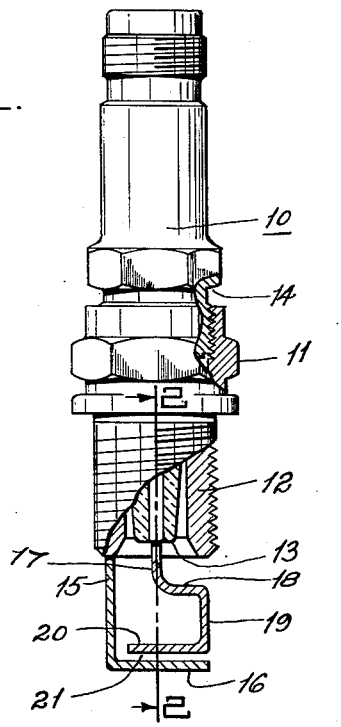

April 1, 1952 R. M. SIMON 2,591,019

SPARK PLUG

Filed April 29, 1949

INVENTOR.
RICHARD M. SIMON
BY
ATTORNEYS

Patented Apr. 1, 1952

2,591,019

UNITED STATES PATENT OFFICE 2,591,019

SPARK PLUG

Richard M. Simon, Ossining, N. Y., assignor to The Texas Company, New York, N. Y., a corporation of Delaware Application April 29, 1949, Serial No. 90,369

3 Claims. (Cl. 123—169)

This invention relates to a spark plug for the ignition system of an internal combustion engine, and to a combination spark-glow plug of this character.

One of the principal objects of the invention is to provide a spark plug constructed to afford a low air velocity zone in the spark gap thereof, whereby the plug, when mounted in an engine cylinder employing swirling combustion air, is adapted to prevent blowout of the spark.

Another object of the invention is to provide an ignition plug of this character which affords both spark and glow ignition on each engine cycle, in addition to preventing spark blowout of the type mentioned above.

Other objects and advantages of the invention will be apparent from the following description when taken in conjunction with the attached drawing and appended claims.

A combination spark-glow plug having elongated electrodes adapted to depend into the active portion of the cylinder combustion space so as to be directly exposed to the combustible gases and the heat of combustion, and wherein one or both of the electrodes is constructed to provide a heat retaining glow portion that will retain its incandescence between successive engine cycles, is more broadly disclosed and claimed in the copending application of William T. Tierney and Charles W. Davis, Serial No. 87,548, filed April 14, 1949. As set forth therein, this type of combination spark-glow plug is particularly designed for use in connection with the non-knocking fuel injection engine disclosed and claimed in the copending application of Everett M. Barber, Serial No. 10,598, filed February 25, 1948, now Patent No. 2,484,009, dated October 11, 1949. In this engine, the first increment of injected fuel is electrically ignited substantially as soon as combustible fuel vapor-air mixture is formed therefrom at the very beginning of the injection period. Consequently, preignition is not a problem and the provision of a glow plug which effectively retains its incandescence of igniting character between successive engine cycles is an advantage rather than a detriment as in the conventional type of Otto cycle engine. Following ignition of the first increment of injected fuel, as pointed out above, which occurs in a localized portion or segment of the combustion space with the establishment of a flame front, fuel injection is continued into the compressed combustion air immediately in advance of the flame front, while the compressed combustion air and the locus of fuel injection are moved relatively to each other in an orderly manner throughout the balance of the injection period. The net result is that additional increments of combustible fuel vapor-air mixture are progressively formed, ignited by the advancing flame front and burned substantially as rapidly as produced. In this manner, there is no opportunity for the accumulation in the combustion space of sufficient unburned combustible mixture as to be susceptible of spontaneous combustion with the resultant knocking of the engine.

In a preferred embodiment of the non-knocking engine of said Barber application, a high velocity swirling movement is imparted to the combustion air in the engine cylinder, and the fuel is injected from a fixed locus of injection into one side of the combustion space, generally in the direction of air swirl, while said high velocity swirling movement of the air is maintained. The present invention constitutes an improvement over the combination spark-glow plug of said Tierney and Davis application, which is particularly adapted for use in the Barber engine employing air swirl to prevent blowout of the timed spark by the swirling air and thereby secure more effective ignition by the joint action of glow and spark ignition on each cycle. However, as described in greater detail hereinbelow, the invention is not restricted to a combination spark-glow plug for this particular use, but is of broader application either in the form of a simple spark plug or a combined spark-glow plug for use generally in internal combustion engines employing high velocity air or gas movement in the combustion space during the period of ignition.

Figure 2:
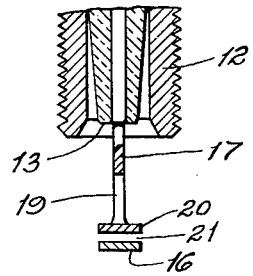

In the drawing, which discloses a preferred embodiment of the invention:

Figure 1 is a side elevational view partly in section of a combination spark-glow plug constructed in accordance with the present invention; and Figure 2 is a partial vertical sectional view taken on the plane of the line 2—2 of Figure 1.

Referring to the drawing, the body of the plug is indicated generally by the numeral 10. This plug body may be of entirely conventional construction and forms no part of the present invention so detailed illustration thereof is unnecessary. Any of the conventional types of plug bodies having the usual metal shell 11 with reduced threaded neck 12 for insertion in the head of an internal combustion engine cylinder, the inner insulating core 13 and coupling nut 14 for holding the parts in assembled relationship, can be employed. Attached to the metal shell 11 is an outer grounded wire electrode 15 which depends vertically below the lower end of the threaded neck 12 at least ½" and up to about 1" or more, depending upon the depth of the combustion space of the engine at top dead center of the piston stroke. The lower end of electrode 15 is bent inwardly at substantially right angles and extends across a major portion of a projected diameter of the lower end of neck 12. As shown more particularly in Figure 2, this inwardly extending portion denoted by the numeral 16 is flattened to provide a rectangular cross-section which is at least 3 times the cross-section of the depending wire portion of electrode 15.

Rigidly mounted in the insulating core 13 is an axial insulated wire electrode 17. As shown, the depending wire portion of this electrode is bent outwardly at 18 a distance slightly less than the radius of the threaded neck 12, so that the electrodes will freely pass through the threaded socket in the cylinder as the plug is inserted. This electrode is then bent downwardly as indicated at 19 to depend diametrically opposite the depending portion of electrode 15; and, at a point slightly above the end of inwardly extending portion 16, is bent inwardly and extended to overlie in parallel relationship the major part of inwardly extending portion 16. As shown in Figure 2, this inwardly extending portion of electrode 17, which is indicated by the numeral 20, is also flattened to provide a rectangular cross section which is at least 3 times that of the depending wire portion of the electrode. The lower surface of portion 20 of electrode 17 and the upper surface of portion 16 of electrode 15, thus extend in parallel relationship and in close juxtaposition, to provide the spark gap 21 therebetween. In accordance with the present invention, this spark gap 21 is formed with a width (Figure 2) of at least 1/16" and up to about ½", and with a length (Figure 1) of at least ½" and up to about 1" or slightly less than the diameter of the threaded neck 12. The spark gap 21 thereby functions as a low air velocity zone when the plug is mounted in an engine cylinder operating with swirling air, and tends to prevent blowout of the spark.

Also, the portions 16 and 20 are both formed with substantially increased mass of metal to provide heat absorbing and retaining portions, from which the normal heat conductance through the depending wire portions of smaller cross sectional area is incapable of withdrawing sufficient heat between engine combustion cycles as to reduce the temperature of these portions 16 and 20 below a glowing incandescence. As shown in Figures 1 and 2, each of these flattened portions 16 and 20 has a thickness which is substantially equal to or greater than the diameter of the wire electrode. The increased mass of metal is provided primarily by forming these glow portions of substantially enlarged width and length. The cross sectional area of each of these glow portions may range from about 3 times that of its depending wire portion up to about 6–8 times the cross sectional area thereof in order to retain them at an igniting red to white incandescence between successive combustion cycles. While both inwardly extending portions forming the spark gap are constructed to provide glowing characteristics in the preferred embodiment, it is to be understood that only one of these portions can be formed in this manner, with the other in that case being substantially thinner but still having the width and length as specified in order to provide the low air velocity zone at the spark gap.

In fabricating these electrodes, this may be conveniently accomplished by welding a conventional wire electrode to a lower flattened metal strip of the required width and length. Or, for increased strength, a wire electrode of increased length can be bent so that the lower end thereof extends inwardly in the manner indicated, and then an additional metal strip with a flattened spark gap surface welded on the opposite side to the wire throughout the length of the inwardly extending portion thereof. Again, each electrode can be formed from a wire having a lower portion of substantially increased diameter which can be bent and flattened to substantially the shape illustrated. It will be appreciated that only the cooperating upper and lower surfaces respectively of the two electrodes, which surfaces form the spark gap, need be flattened to extend in parallel relationship; whereas the balance of each inwardly extending portion can be built up with metal to assume various curved or irregular shapes and cross sections to provide the metal mass required for glowing characteristics; and the term "flattened" as used in the following description and claims is to be understood as embracing the various configurations described above.

It will be understood that the electrodes 15 and 17 are purposely extended so as to depend down into the active portion of the combustion space where they are directly contacted by the combustible gases and exposed to the direct heat of the combustion when the plug is mounted in an engine cylinder. After the engine has been started and combustion initiated through timed sparks jumping the gap 21, the glow portions 16 and 20 will rapidly absorb and retain a glowing red to white heat between successive cycles, whereby the ignition on succeeding cycles is accomplished by the conjoint action of glowing heat and spark action. Moreover, since the glow portions retain their glowing heat of igniting effectiveness between successive cycles, ignition of the first increment of injected fuel on a succeeding cycle is insured as soon as the resulting combustible fuel vapor-air mixture contacts the electrodes, even in the event of spark failure at the gap 21 or improper timing of the spark. Since the high velocity air swirl in the combustion space is dampened out in the spark gap zone 21, the liability of spark failure due to blowout is materially lessened. The conjoint action of the glow surfaces substantially surrounding the spark gap with the high intensity spark of substantial length and breadth in the gap materially increases the area of ignitible contact of the localized segment of combustible mixture and promotes more rapid and effective ignition of the latter to establish the flame front.

While the combination spark-glow plug described above is particularly useful in the non-knocking fuel injection engine referred to above, it is to be understood that this plug is also useful in other types of engines employing swirling air, or wherein a high velocity air or gas current is directed over the electrodes at the time of spark ignition. For example, the plug is useful in air swirl diesel engines, where the conjoint action of glow surface and spark may be employed to reduce ignition lag. Also, the plug is useful in semi-diesels normally employing glow ignition.

The present invention also includes a spark plug constructed as shown in Figures 1 and 2 and as above described, except that the inwardly extending flattened portions 16 and 20 of the electrodes are not thickened or built up with metal to provide glowing characteristics. This form of simple spark plug is particularly useful in an engine of the Hesselman type, for example, wherein fuel is injected into swirling compressed air to form a stratified charge which swirls around the combustion space and is ignited by timed spark ignition after or substantially at the termination of fuel injection. Here again, the particular construction of the electrodes involving the parallel flat strips of substantial width and length provides a spark gap which is directly exposed to the swirling stratified charge and yet forms a low velocity gas zone. In engines of this type, it has heretofore been considered advisable to shield electrodes of the spark plug from the direct action of the swirling stratified charge, such as by positioning the electrodes in a pocket off of the main combustion space or mounting them behind a baffle or shield, thus relying upon eddy currents to carry sufficient combustible mixture to the vicinity of the spark gap for ignition. The present invention enables the electrodes to be extended directly down into the swirling stratified charge in the main combustion space, while at the same time minimizing or preventing blowout of the spark during the timed ignition on each cycle.

While the specific construction illustrated constitutes a preferred embodiment of the invention, it is to be understood that the shape and construction of the electrodes can be varied from that shown. Thus, the axial electrode, instead of being bent outwardly at 18 at substantially right angles and then downwardly at 19 in a vertical direction, can be inclined downwardly on a diagonal path and then bent inwardly to provide the flattened portion 20. Also, instead of having the inwardly extending portion 20 of the center electrode overlie the inwardly extending portion 16 of the outer electrode, the portion 20 can underlie portion 16. In all embodiments, it will be understood that the flattened parallel extending portions of the electrodes forming the spark gap have substantial width and length, and depend into the combustion space so as to lie generally parallel to the direction of movement of the swirling air or gas therein, in order to constitute the low velocity air or gas zone in the spark gap as previously described. Moreover, instead of having the portions 16 and 20 of the electrodes extend in a straight line or path as shown, they can be curved in horizontal planes so as to extend generally along a concentric circle of the combustion space, when the plug is mounted in the cylinder head and extends downwardly into the combustion space at some location removed from the center or axis of the combustion space. It will be understood that the plug can also be mounted in the side wall of the cylinder, in which case the portions 16 and 20 of the electrodes can be curved in a vertical plane as shown in Figure 1 to again lie along concentric circles of the combustion space.

In all cases, the portions 16 and 20 will be sufficiently thin to avoid glowing characteristics and provide simple spark action where the plug is to be employed in an engine operating with the combustion space filled or partly filled with combustible mixture in contact with the electrodes prior to the time of ignition on each cycle, where glowing characteristics would be a detriment from the standpoint of preignition. Where the plug is adapted for use in fuel injection engines, in which the first increment of injected fuel is to be ignited substantially as soon as combustible fuel vapor-air mixture is formed therefrom, one or both of the flattened portions 16 and 20 can also be built up with metal to provide a heat absorbing capacity sufficient to counterbalance the normal heat conducting capacity of the remainder of the electrode or electrodes, as well as the heat lost by radiation and convection from said glow portion or portions, whereby one or both of said portions is maintained at glowing incandescence between successive engine cycles.

By way of specific example, a combination spark-glow plug was constructed substantially as shown in Figures 1 and 2. The outer grounded electrode 15 was formed of No. 12 gauge Nichrome wire for the vertical leg which extended ¾" below the bottom of the metal shell 11 of the plug body; and this vertical leg was welded to an inwardly extending Nichrome strip 16 of rectangular cross section having a length of ¾", a width of $\tfrac{5}{16}$" and a thickness of $\tfrac{3}{32}$". The axial insulated electrode 17 was also constructed of No. 12 gauge Nichrome wire which depended $\tfrac{5}{16}$" below the bottom of the metal shell 11 of the plug body, then was bent outwardly at 18 for ⅜" and then downwardly at 19 for $\tfrac{5}{16}$"; and the lower end of wire portion 19 was welded to a second Nichrome strip 20 having a width and thickness the same as that of strip 16 and a length of ⅝". The construction provided inwardly extending portions 16 and 20 wherein each had a cross sectional area about 5 times the cross sectional area of the Nichrome wire connected thereto, providing the glowing characteristics in addition to the timed spark action in the spark gap which had a width of $\tfrac{5}{16}$" and a length of ⅝". The plug was found to function very satisfactorily in the non-knocking fuel injection engine employing swirling air as heretofore described.

Obviously many modifications and variations of the invention, as hereinbefore set forth, may be made without departing from the spirit and scope thereof and, therefore, only such limitations should be imposed as are indicated in the appended claims.

I claim:

1. A spark plug comprising a plug body, a grounded electrode having a vertical leg fastened at its upper end to a lower peripheral portion of said plug body, said vertical leg being connected at its lower end to a horizontal sparking member extending inwardly substantially along a diameter of the plug body and below the bottom of the latter, an axial insulated electrode depending from said plug body and connected at its lower end to a second horizontal sparking member extending inwardly substantially along said diameter from adjacent the free end of said first sparking member in closely spaced and parallel relationship with said first sparking member, the opposed parallel faces of said sparking members being flat and substantially rectangular in shape to provide a spark gap therebetween at least ½ inch in length and at least $\tfrac{3}{16}$ inch in width, said electrodes being freely exposed below said plug body so as to locate said spark gap within the active swirling gaseous space of the combustion chamber when said plug is mounted non-axially in an engine cylinder having swirling air in the combustion chamber thereof, and with the length of said sparking members lying generally parallel to the direction of movement of the swirling air therein whereby said long and wide spark gap provides a low air velocity zone in the swirling air to prevent blowout of the spark by said swirling air.

2. A spark plug according to claim 1, wherein said axial insulated electrode depends from the center of the plug, then is bent outwardly a distance just short of the radius of the lower end of the plug body, then is bent downwardly to a point just above the free end of said first sparking member, and is there connected to said second sparking member which closely overlies said first sparking member.

3. A spark plug according to claim 1, wherein at least one of said sparking members is built up with solid metal throughout a substantial portion of its extent to provide a heat retaining glow portion having a cross-sectional area at least three times that of the depending vertical leg connected thereto, said depending leg constituting the sole connection between said glow portion and said plug body, with the length of said depending leg being large in relation to the cross-sectional area thereof to thereby restrict the heat conducting path from said glow portion to said plug body, and the volume of metal and the volume to surface ratio of said glow portion being large such that said glow portion retains heat of igniting effectiveness between successive cycles capable of igniting a combustible fuel vapor-air mixture without the aid of a spark, in addition to the jumping of a spark across said spark gap on each cycle.

RICHARD M. SIMON.

REFERENCES CITED

The following references are of record in the file of this patent:

UNITED STATES PATENTS

| Number | Name | Date |
|---|---|---|
| 1,376,194 | Ensign | Apr. 26, 1921 |
| 1,447,763 | Daugherty | Mar. 6, 1923 |
| 1,537,938 | Dumbovich | May 19, 1925 |
| 1,992,071 | Healey | Feb. 19, 1935 |
| 2,322,616 | Carson et al. | June 22, 1943 |